US010490935B2

(12) United States Patent
Tachikawa et al.

(10) Patent No.: US 10,490,935 B2
(45) Date of Patent: Nov. 26, 2019

(54) INFORMATION PROCESSING APPARATUS

(71) Applicant: FUJITSU CLIENT COMPUTING LIMITED, Kawasaki-shi, Kanagawa (JP)

(72) Inventors: Hideaki Tachikawa, Kawasaki (JP); Takeshi Uchiyama, Kawasaki (JP)

(73) Assignee: Fujitsu Client Computing Limited (JP)

( * ) Notice: Subject to any disclaimer, the term of this patent is extended or adjusted under 35 U.S.C. 154(b) by 0 days.

(21) Appl. No.: 16/445,303

(22) Filed: Jun. 19, 2019

(65) Prior Publication Data

US 2019/0305480 A1    Oct. 3, 2019

Related U.S. Application Data

(63) Continuation of application No. PCT/JP2017/044741, filed on Dec. 13, 2017.

(30) Foreign Application Priority Data

Jan. 4, 2017   (JP) .................................. 2017-000115

(51) Int. Cl.
*H01R 13/627* (2006.01)
*H01R 24/62* (2011.01)

(52) U.S. Cl.
CPC ..... *H01R 13/6272* (2013.01); *H01R 13/6278* (2013.01); *H01R 24/62* (2013.01)

(58) Field of Classification Search
CPC ............ H01R 13/6272; H01R 13/6278; H01R 24/62; G11B 33/12
See application file for complete search history.

(56) References Cited

U.S. PATENT DOCUMENTS 5,602,723 A * 2/1997 Takahashi ............ H05K 7/1422
257/659
2002/0176234 A1 * 11/2002 Sawada ................ H05K 7/1441
361/736

FOREIGN PATENT DOCUMENTS

JP    S63-178084 U    11/1988
JP    H06-045032 A    2/1994
(Continued)

OTHER PUBLICATIONS

International Search Report for PCT/JP2017/044741, dated Feb. 20, 2018 (4 pages).

*Primary Examiner* — Abdullah A Riyami
*Assistant Examiner* — Nader J Alhawamdeh
(74) *Attorney, Agent, or Firm* — Harness, Dickey & Pierce, P.L.C.

(57) ABSTRACT

An information processing apparatus includes a connector, a chassis main body, and a fixing portion. The connector has a connector main body and an attachment portion which has a hole for attachment. The fixing portion includes a pair of first locking portions and a projecting portion. The pair of first locking portions project from the chassis main body so as to be located on both sides of the connector when the connector is attached, and have a flange respectively which forms a void through which the attachment portion is inserted between the flange and the chassis main body. The projection portion projects from the chassis main body to an insertion path of the connector when the attachment portion is not inserted and is configured to be pushed by the attachment portion to retreat from the insertion path when the attachment portion is inserted.

3 Claims, 9 Drawing Sheets

(56) References Cited

FOREIGN PATENT DOCUMENTS

| JP | H08-222328 | A |   | 8/1996 |
|----|------------|---|---|--------|
| JP | 2000-077133 | A |   | 3/2000 |
| JP | 2014-211931 | A |   | 11/2014 |
| JP | 2014211931 | A | * | 11/2014 |
| WO | WO-2018128061 | A1 | * | 7/2018 |

* cited by examiner

INFORMATION PROCESSING APPARATUS

The application is a continuation application of PCT Patent Application No. PCT/JP2017/044741, filed Dec. 13, 2017, which claims priority from Japanese Patent Application No. 2017-000115, filed Jan. 4, 2017. The entire contents of both the above PCT Application and the above Japanese Application are incorporated herein by reference.

FIELD OF THE INVENTION

The present invention relates to an information processing apparatus which includes a fixing portion of a connector.

DESCRIPTION OF RELATED ART

In an information processing apparatus such as a desktop-type personal computer (hereinafter, a personal computer), a printed circuit board, an optical disc drive, a hard disk drive, and the like that are built-in units are provided in a chassis. An optical disc drive (hereinafter referred to as an ODD in some cases) and a hard disk drive (hereinafter referred to as an HDD in some cases) are connected to the printed circuit board using a connection cable. A connector that can be fitted into a connection port of the ODD or HDD is attached to one end of this connection cable, and a connector that can be fitted into a connection port of the printed circuit board is attached to the other end thereof. The connector at the one end of the connection port is inserted into the connection port of the ODD or the HDD, and an electrical connection between the connection port and the ODD or the HDD is completed.

In the desktop-type personal computer, the connection port of the ODD or the HDD may be connected to the connector of the connection cable by sliding movement of the ODD or the HDD in some cases. At this time, the connector of the connection cable is fixed to a chassis in a main body of the personal computer. When the connector is fixed to the chassis, the connector is screwed to the chassis in the main body to withstand a load when the connector is inserted into the connection port by sliding movement of the HDD or the ODD. In order to connect an electronic device or the like to the connector as described above, a technology for fixing the connector of the connection cable itself to other members is disclosed in, for example, Japanese Unexamined Patent Application, First Publication No. H6-45032 and Japanese Unexamined Patent Application, First Publication No. 2000-77133.

SUMMARY OF THE INVENTION

When a connector is screwed to a chassis, tightening work of a screw is performed after a female screw process is performed on the chassis. For this reason, there are many procedures to fix a connector and a cost increase occurs.

In one aspect, an object of the present invention is to provide an information processing apparatus capable of fixing a connector of a connection port with fewer procedures.

An information processing apparatus of an aspect of the present invention includes a connector, a chassis main body, and a fixing portion. The connector is configured to be inserted into a built-in unit. The connector has a connector main body and an attachment portion which has a hole for attachment formed on both sides of the connector main body in an insertion direction of the connector. The built-in unit is attachable to the chassis main body. The fixing portion is included in the chassis main body to fix the connector. The fixing portion includes a pair of first locking portions and a projecting portion. The pair of first locking portions project from the chassis main body so as to be located on both sides of the connector when the connector is attached, and have a flange respectively which forms a void through which the attachment portion is inserted between the flange and the chassis main body. The projecting portion is configured to fit into the hole of the attachment portion and is provided between the pair of first locking portions. The projection portion projects from the chassis main body to an insertion path of the connector when the attachment portion is not inserted into the void and is configured to be pushed by the attachment portion to retreat from the insertion path when the attachment portion is inserted into the void.

DETAILED DESCRIPTION OF THE INVENTION

Figure 1A:
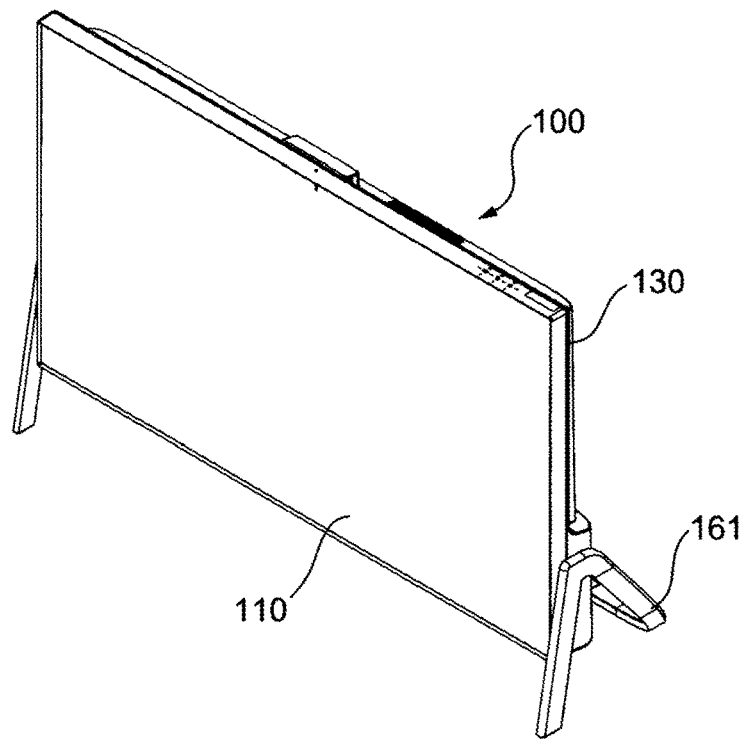
FIG. 1A is a perspective view of a disclosed personal computer viewed forward and obliquely upward.

Hereinafter, embodiments of the present application will be described in detail on the basis of a specific example with reference to the accompanying drawings. In addition, in the following embodiments, the same or similar elements are denoted by the same reference numerals, and a scale of these drawings is appropriately changed to facilitate understanding.

Figure 1B:
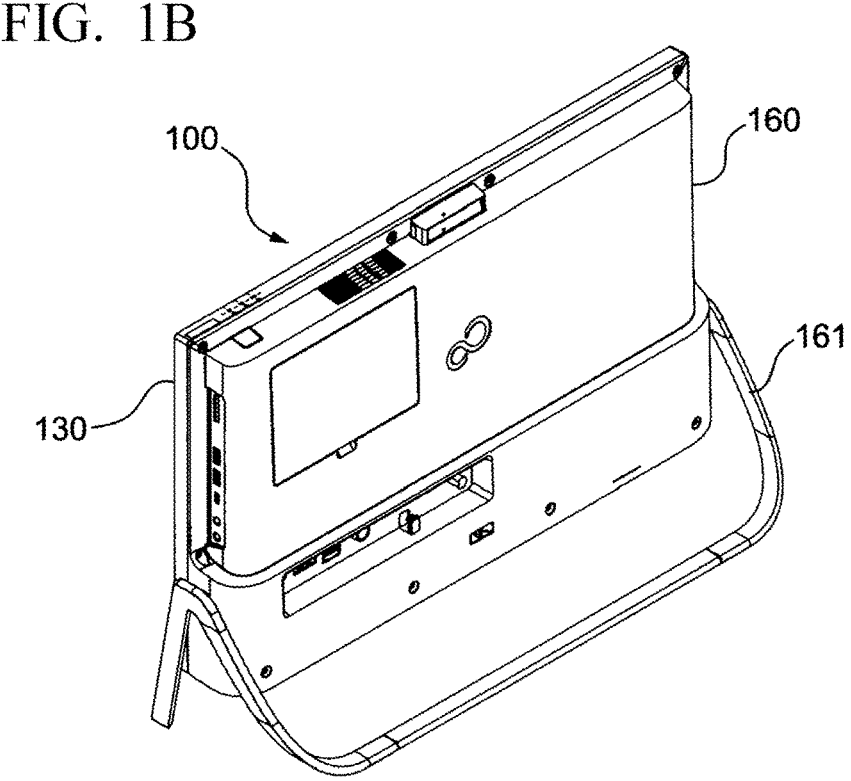
FIG. 1B is a perspective view viewed backward and obliquely upward.

FIGS. 1A and 1B show an all-in-one desktop-type personal computer 100 (hereinafter, a personal computer 100) which is an example of an information processing apparatus of the present embodiment. The personal computer 100 includes a display unit 110, a resin chassis 130, and a rear cover 160. The personal computer 100 is capable of self-standing due to a leg 161 provided on the resin chassis 130.

In addition, the personal computer 100 is connected to input devices (not shown) such as a keyboard and a mouse, and is operated by a user.

Figure 2A:
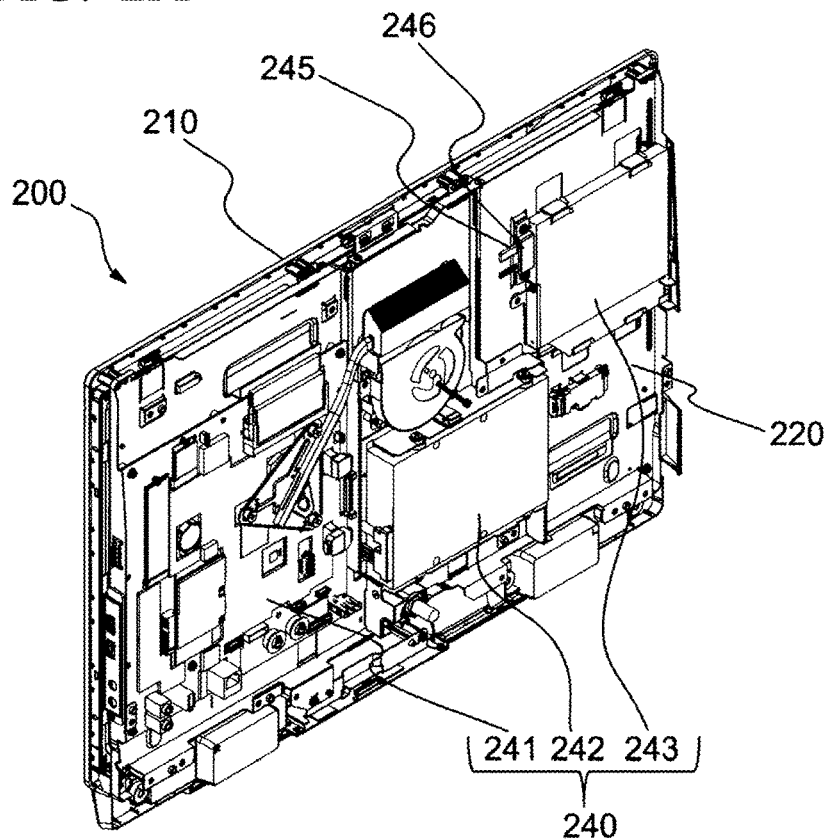
FIG. 2A is a perspective view which shows an interior of a personal computer of a comparative technology.

Here, a personal computer of an information processing apparatus which is a comparative technology will be described with reference to FIGS. 2A to 3B. FIG. 2A is a perspective view which shows an interior of a personal computer 200 which is a comparative technology. The personal computer 200 is, like the personal computer 100 of FIG. 1, an all-in-one desktop-type personal computer, and the display unit 210 and a built-in unit 240 including a printed circuit board 241 are designed to be integrated. In the personal computer 200 of a comparative technology, as shown in FIG. 2A, the printed circuit board 241, a hard disk drive 242, and an optical disc drive 243 are attached to a metal chassis 220 as the built-in unit 240. Then, for example, the printed circuit board 241 and the optical disc drive 243 are electrically connected by a connection cable 245 (a middle of the cable is omitted in FIG. 2A).

Figure 2B:
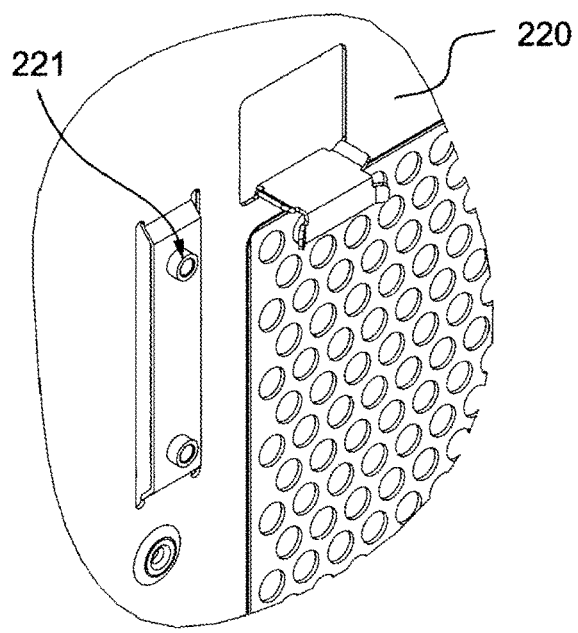
FIG. 2B is a diagram which shows a stud provided on a metal chassis.
Figure 3A:
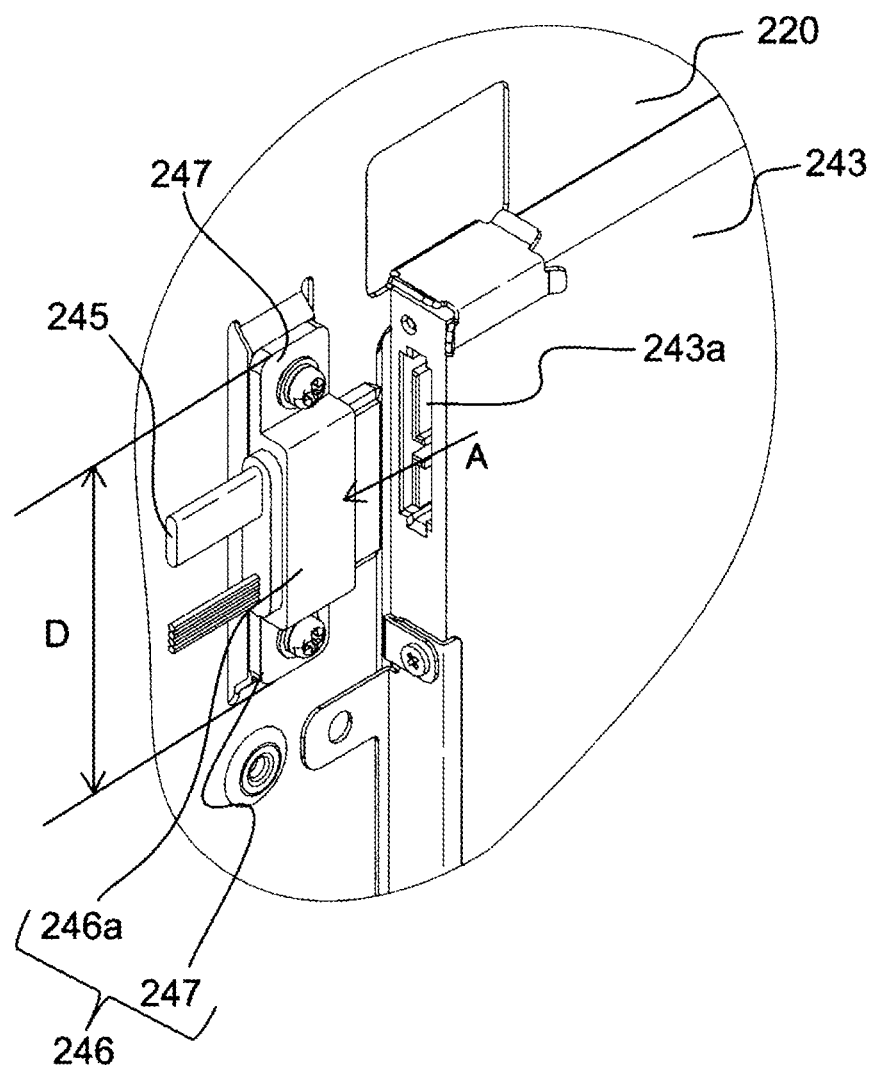
FIG. 3A is a diagram which shows a connector attached to the personal computer of a comparative technology and an optical disc drive immediately before being connected to the connector.
Figure 3B:
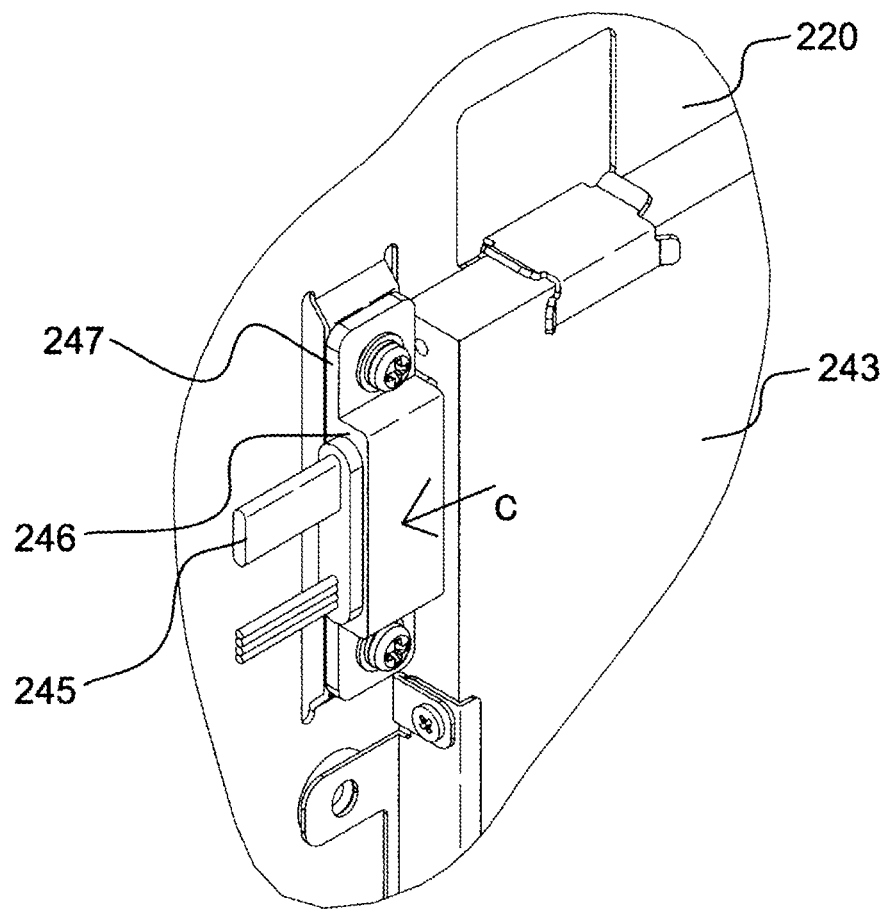
FIG. 3B is a diagram which shows a state in which the optical disc drive is connected to the connector.

As shown in FIGS. 3A and 3B, a connector 246 is provided at an end portion of the connection cable 245, and the connector 246 is connected to a connection port 243a of the optical disc drive 243. The connector 246 is a side lock type connector, and screwing attachment portions 247 are provided on both sides in an insertion direction (the direction of the arrow A in FIG. 3A) of the connector 246 on the connector main body 246a having terminals. In addition, the connector 246 including the attachment portion 247 has a predetermined dimension D in a width direction with respect to an insertion direction thereof. As shown in FIG. 2B, a stud 221 for fixing the connector 246 is provided in the metal chassis 220 in the personal computer 200 of a comparative technology. The connector 246 is fixed to the metal chassis 220 by screwing the attachment portion 247 into the stud 221.

The optical disc drive 243 (shown in FIG. 3A) will be slid in a C direction in FIG. 3B with respect to the connector 246 fixed to the metal chassis 220. As shown in FIG. 3B, a terminal of the connector 246 is inserted into the connection port 243a of the optical disc drive 243 when the optical disc drive 243 is slid, and the connection is completed.

In the comparative technology, the stud 221 is formed in the metal chassis 220 and a female screw process is performed thereon to screw the connector 246 into the metal chassis 220. In addition, cost occurs due to procedures such as tightening work of a screw at the time of assembly.

A fixing portion of a connector, which is provided in the information processing apparatus of the present embodiment will be described with reference to FIGS. 4 to 8.

Figure 4:
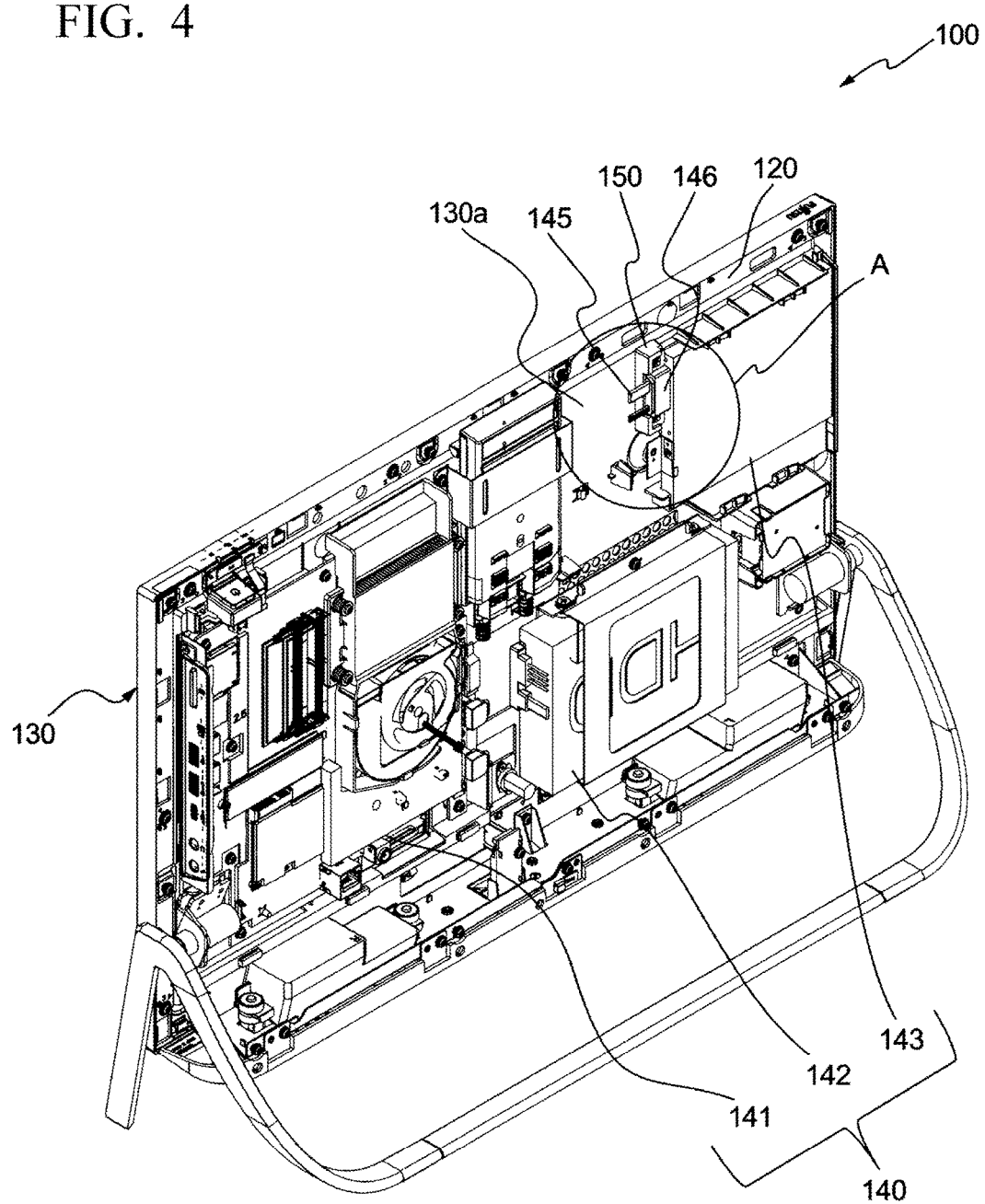
FIG. 4 is a perspective view which shows a state in which a rear cover is removed from the disclosed personal computer.

As shown in FIG. 4, the personal computer 100 includes a metal chassis 120 provided between the display unit 110 (refer to FIG. 1A) and the resin chassis 130 therein. In addition, the personal computer 100 includes a built-in unit 140 including a printed circuit board 141, a hard disk drive 142, and an optical disc drive 143. The resin chassis 130 has a chassis main body 130a made of a resin to which the built-in unit 140 is attached and a fixing portion 150 formed in the chassis main body 130a to fix a connector 146. As shown in FIG. 4, the optical disc drive 143 is attached to the chassis main body 130a, and the optical disc drive 143 is connected to the printed circuit board 141 using a connection cable 145 (a path of the connection port in the middle is omitted in FIG. 4).

The connection cable 145, like the connection cable 245 shown in FIG. 3A, is a connection cable having a side lock type connector 146. The connector 146 has a connector main body 146a including a terminal, and attachment portions 147 provided at both ends with respect to an insertion direction (the direction of the arrow A) of the connector 146 (refer to FIG. 6A). In addition, the connector 146, like the connector 246 shown in FIG. 3A, has a predetermined dimension D in a width direction with respect to the insertion direction thereof. A hole 148 for attachment is formed in each of the attachment portions 147 at both ends.

Figure 5A:
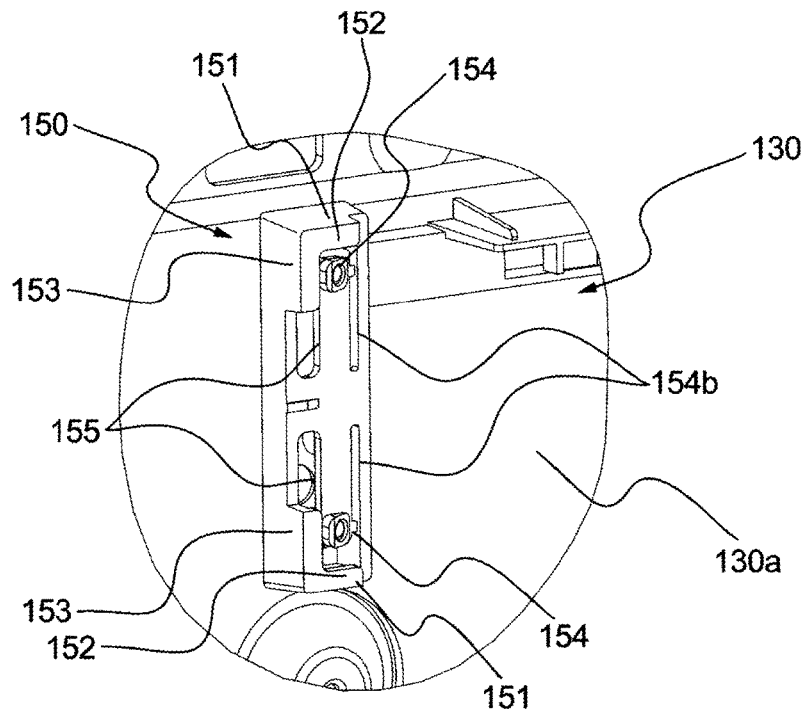
FIG. 5A is an enlarged view of a portion A of FIG. 4 which shows a fixing portion.
Figure 5B:
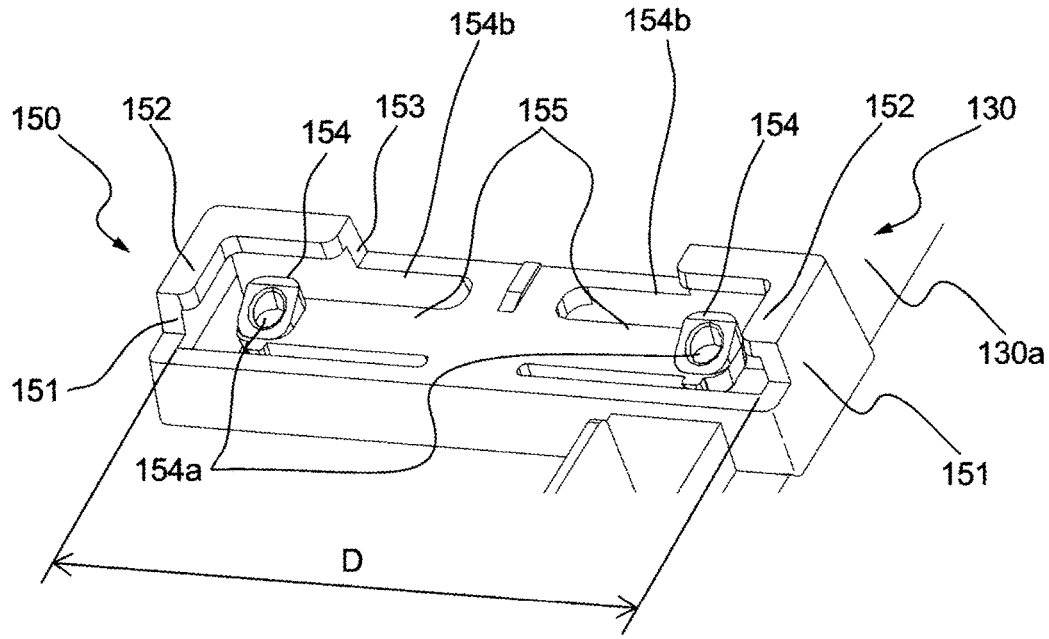
FIG. 5B is a perspective view of the fixing portion which is viewed from another view point.

The fixing portion 150 is for attaching the connector 146 to the resin chassis 130, and is formed in the chassis main body 130a as shown in FIGS. 5A and 5B. The fixing portion 150 includes a pair of first locking portions 151 having a flange 152, a pair of projecting portions 154, and a pair of second locking portions 153.

The pair of first locking portions 151 are locking portions that restrict movement of the connector 146 by coming into contact with the attachment portions 147 on both sides thereof. The pair of first locking portions 151 are located on both sides of the connector 146 and project from the chassis main body 130a when the connector 146 is attached. The pair of first locking portions 151 are provided on the resin chassis 130 so as to be separated at the same dimension as a width D of the connector 146 such that the connector 146 can be inserted therebetween (FIG. 5B). The flange 152 is a flange extending from a top of each of the pair of first locking portions 151 to the inside of the pair of first locking portions 151. The flange 152 is provided to allow a void through which the attachment portion 147 of the connector 146 is inserted between the flange 152 and the chassis main body 130a (refer to FIG. 7B). If the connector 146 is inserted between the pair of first locking portions 151, the flange 152 prevents the attachment portion 147 from separating from the resin chassis 130. The connector 146 can be inserted into the void formed between the resin chassis 130 and the flange 152 in a direction of an arrow A of FIG. 6.

As shown in FIGS. 5A and 5B, each of the projecting portions 154 is provided at a tip portion of an arm 155 provided in a cantilevered state to extend from a center of the fixing portion 150 in a hole 154b formed in the chassis main body 130a. When the connector 146 is not inserted, each of the projecting portions 154 is made to project from the chassis main body 130a.

The arm 155 is provided to be bendable, and the arm 155 bends when the connector 146 is inserted in the direction of the arrow A between the pair of first locking portions 151. Thereby, the connector 146 can pass therethrough (refer to FIG. 7). That is, the projecting portion 154 is provided to be pushed in the chassis main body 130a. When the connector 146 passes therethrough, the projecting portion 154 enters the hole 148 at a position of the hole 148 for attachment, and restricts movement of the connector 146 in the insertion direction (the direction of the arrow A). In the projecting portion 154 of the present embodiment, when the connector 146 is inserted, an inclined portion 154a inclined with respect to the insertion direction of the connector 146 is formed for easy bending. At the time of the insertion of the connector 146, a bottom of the connector 146 is brought into contact with the inclined portion 154a, and thereby the projecting portion 154 is pushed in. That is, the projecting portion 154 can be pushed to retreat from an insertion path of the connector 146.

Figure 6A:
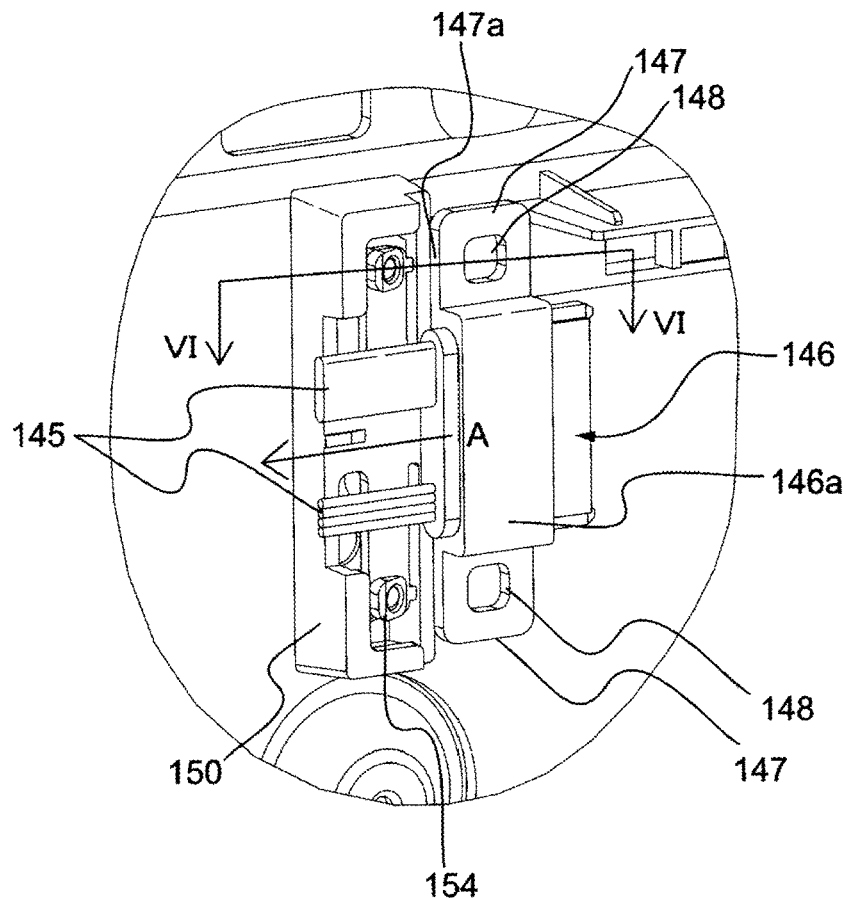
FIG. 6A is a diagram which shows a state immediately before plugging a connector into the fixing portion.
Figure 6B:
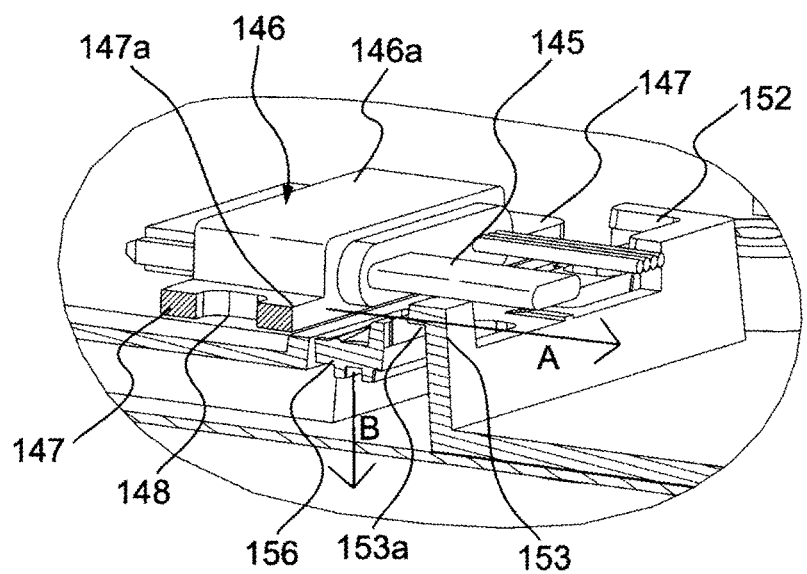
FIG. 6B is a cross-sectional view which is taken along line VI-VI of FIG. 6A.
Figure 7A:
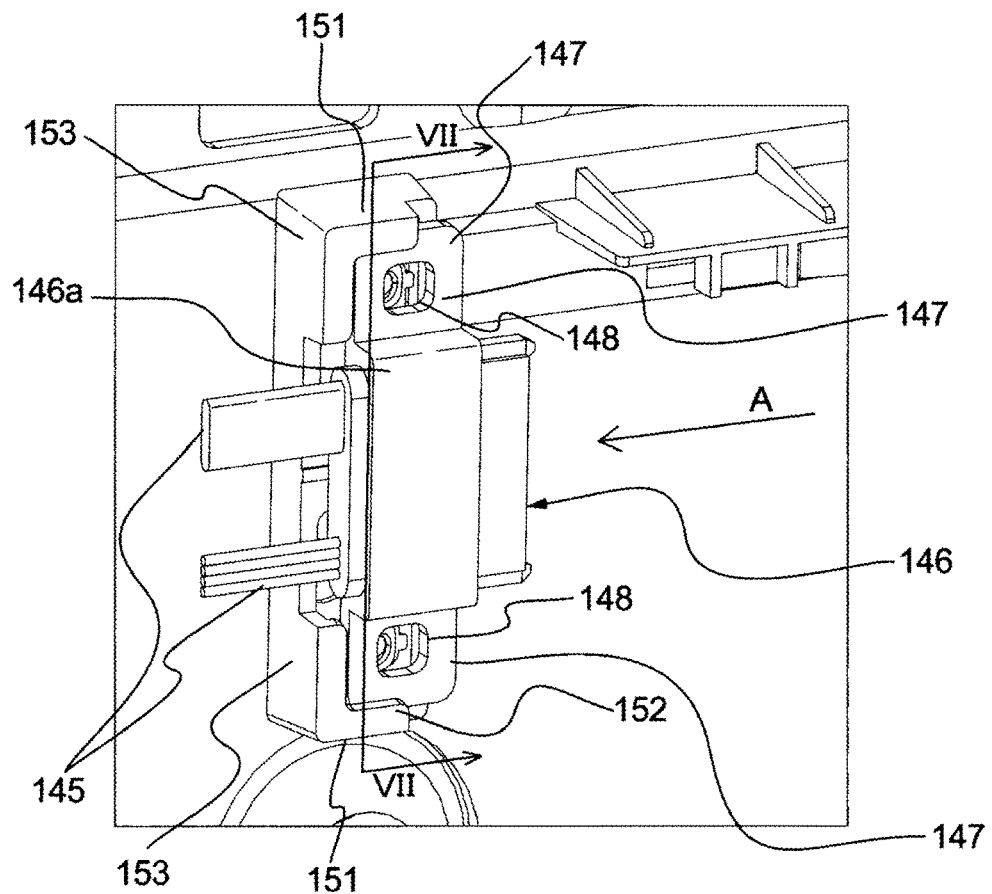
FIG. 7A is a diagram which shows a state in which a connector is being plugged into the fixing portion.
Figure 7B:
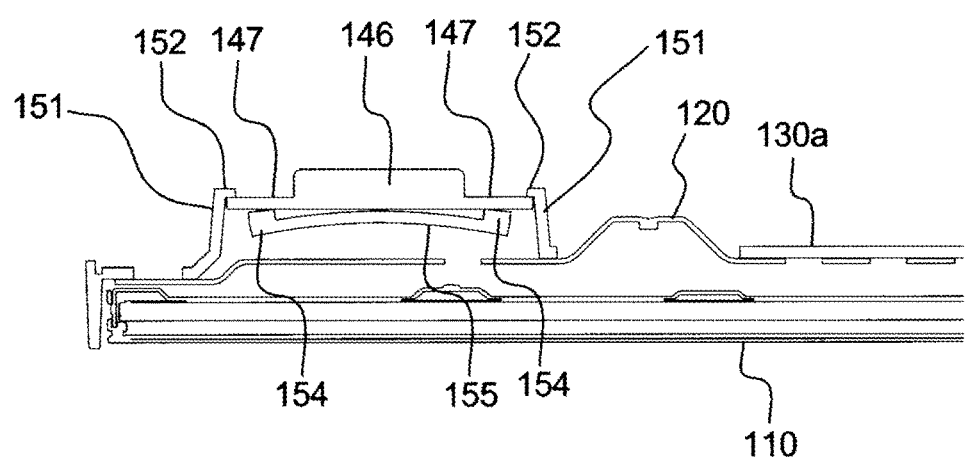
FIG. 7B is a cross-sectional view taken along line VII-VII of FIG. 7A.
Figure 8:
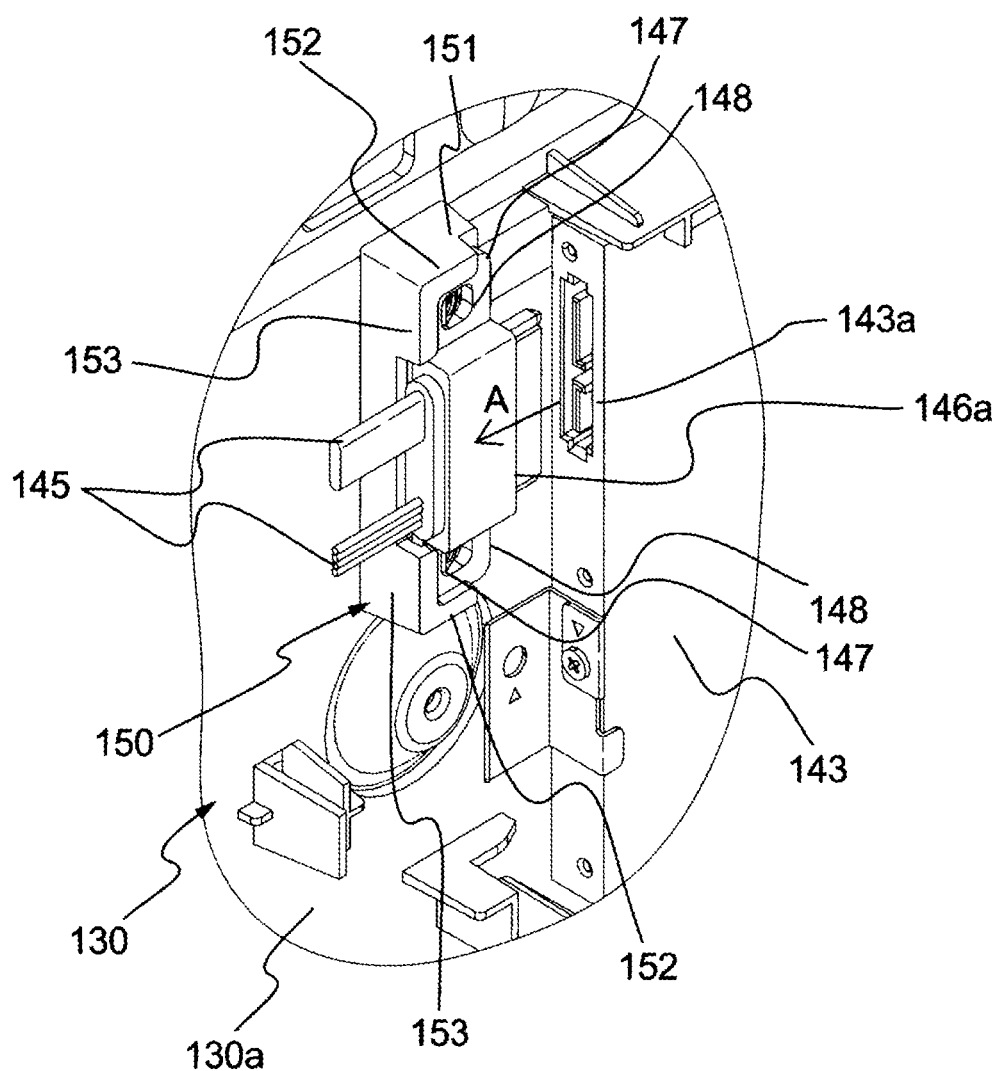
FIG. 8 is a perspective view which shows a state in which a connector is fixed to the fixing portion.

Furthermore, the fixing portion 150 includes a second locking portion 153. When the projecting portion 154 is fitted into the hole 148 of the attachment portion 147, the second locking portion 153 is provided to be in contact with an end portion 147a of the attachment portion 147 (refer to FIG. 6b) located at the top end in the insertion direction when the attachment portion 147 of the connector 146 is inserted into the void. As a result, the connector 146 is prevented from moving from a predetermined position in the insertion direction and is fixed to the resin chassis 130 as shown in FIG. 8. In addition, as shown in FIG. 6B, a flange 153a may be provided in the second locking portion 153. After the connector 146 is fixed to the resin chassis 130, the optical disc drive 143 is slid in a direction of an arrow A of FIG. 8, and the connector 146 is inserted into the connection port 143a of the optical disc drive 143.

The resin chassis 130 of the present embodiment is made of a resin, and the pair of first locking portions 151 and the second locking portion 153 of the fixing portion 150 are formed by molding. In the present embodiment, the pair of first locking portions 151 and the second locking portion 153 are formed to be integrated with the resin chassis 130. However, for example, the first locking portions 151 and the second locking portion 153 may be provided as separate bodies. In addition, movement in the insertion direction of the connector 146 may be restricted only by the projecting portion 154, and in this case, the second locking portion 153 may be omitted.

The fixing portion 150 may be formed in the metal chassis 120, and in this case, the first locking portion 151 and the second locking portion 153 are formed by cutting a part of the metal chassis 120.

The personal computer 100 includes the fixing portion 150, and thereby it is possible to fix a connection connector by causing the connection connector to slide and move from one direction without forming a female screw such as a stud on the resin chassis 130 and without screwing it. That is, since the connection connector is fixed without a part such as a screw and without using a separate tool, it is possible to fix the connector with fewer procedures.

While the preferred embodiments, the modification, and the examples of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

This application has been described in detail above, particularly with reference to preferred embodiments thereof. For easy understanding of this application, a specific form of this application is attached as follows.

(Attachment 1) An information processing apparatus includes a connector that is configured to be inserted into a built-in unit, and has a connector main body and an attachment portion which has a hole for attachment formed on both sides of the connector main body in an insertion direction of the connector, a chassis main body to which the built-in unit is attachable, and a fixing portion included in the chassis main body to fix the connector. The fixing portion includes a pair of first locking portions that project from the chassis main body so as to be located on both sides of the connector when the connector is attached, and have a flange respectively which forms a void through which the attachment portion is inserted between the flange and the chassis main body, and a projecting portion that is configured to fit into the hole of the attachment portion, that is provided between the pair of first locking portions, projecting from the chassis main body to an insertion path of the connector when the attachment portion is not inserted into the void, and that is configured to be pushed by the attachment portion to retreat from the insertion path of the connector when the attachment portion is inserted into the void.

(Attachment 2) The information processing apparatus according to attachment 1, in which the projecting portion has an inclined portion that is inclined with respect to the insertion direction.

(Attachment 3) The information processing apparatus according to claim 1 or 2, in which, when the projecting portion is fitted into the hole of the attachment portion, the fixing portion further includes a second locking portion in contact with an end portion of the attachment portion located at a top end in an insertion direction when the attachment portion of the connector is inserted into the void.

What is claimed is:

1. An information processing apparatus comprising:
   a connector configured to be inserted into a built-in unit, the connector comprising a connector main body and an attachment portion, the attachment portion comprising a hole for attachment formed on both sides of the connector main body in an insertion direction of the connector;
   a chassis main body to which the built-in unit is attachable; wherein
   the chassis main body including a fixing portion to fix the connector, and
   the fixing portion including:
     a pair of first locking portions projecting from the chassis main body so as to be located on both sides of the connector when the connector is attached, the pair of first locking portions comprising a flange respectively, the flange forming a void through which the attachment portion is inserted between the flange and the chassis main body, and
     a projecting portion configured to fit into the hole of the attachment portion, the projecting portion being provided between the pair of first locking portions, the projection portion projecting from the chassis main body to an insertion path of the connector when the attachment portion is not inserted into the void, the projecting portion configured to be pushed by the attachment portion to retreat from the insertion path when the attachment portion is inserted into the void.

2. The information processing apparatus according to claim 1,
   wherein the projecting portion has an inclined portion that is inclined with respect to the insertion direction.

3. The information processing apparatus according to claim 1,
   wherein, when the projecting portion is fitted into the hole of the attachment portion, the fixing portion further includes a second locking portion in contact with an end portion of the attachment portion located at a top end in the insertion direction when the attachment portion of the connector is inserted into the void.

* * * * *